Feb. 18, 1969 C. L. LAKE ET AL 3,427,776
SELF-ADHERENT, SHOCK ABSORBING, SEALING AND SPACING STRIP
Filed June 14, 1966
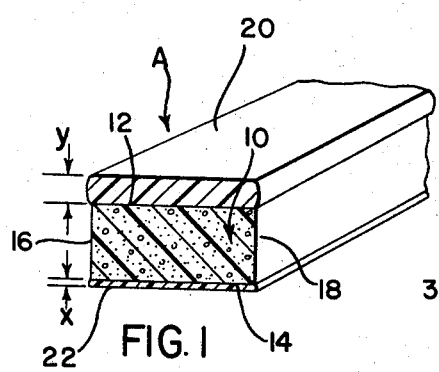
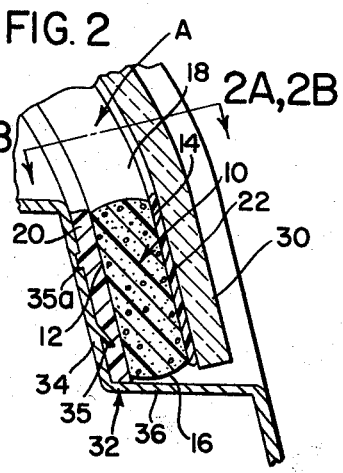
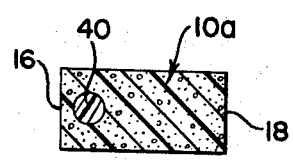
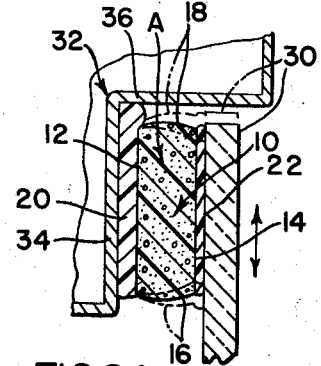
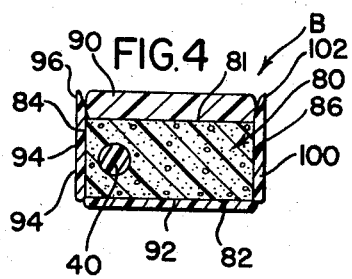
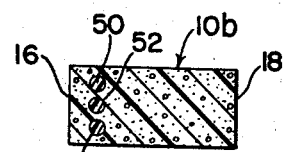
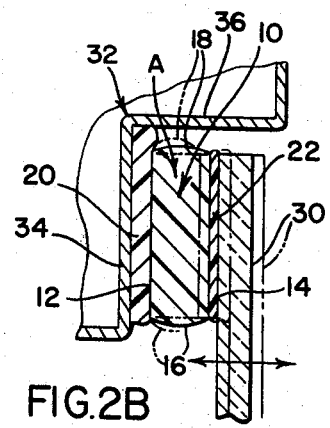
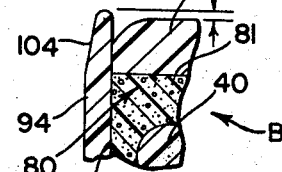
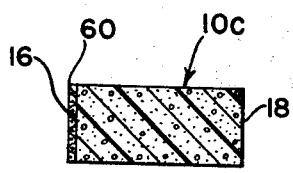
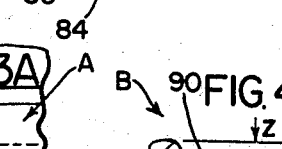
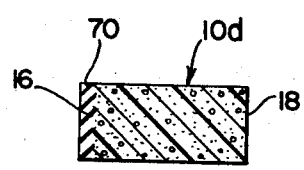
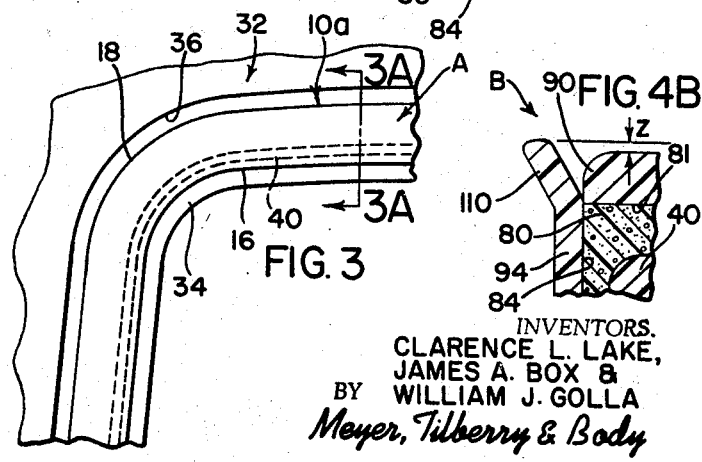
INVENTORS.
CLARENCE L. LAKE,
JAMES A. BOX &
BY WILLIAM J. GOLLA
Meyer, Tilberry & Body
ATTORNEYS

INVENTORS.
CLARENCE L. LAKE,
JAMES A. BOX &
BY WILLIAM J. GOLLA

Meyer, Tilberry & Body
ATTORNEYS

United States Patent Office 3,427,776
Patented Feb. 18, 1969

3,427,776
SELF-ADHERENT, SHOCK ABSORBING, SEALING AND SPACING STRIP
Clarence L. Lake, Cleveland Heights, James A. Box, Parma, and William J. Golla, Garfield Heights, Ohio, assignors to The Tremco Manufacturing Company, Cleveland, Ohio, a corporation of Ohio
Filed June 14, 1966, Ser. No. 557,484
U.S. Cl. 52—403
Int. Cl. E04b 1/68; E06b 7/22
9 Claims

ABSTRACT OF THE DISCLOSURE

There is provided a sealing strip for use between a glass pane and a supporting structure having pronounced irregularities. This strip includes a shock absorbing support tape formed from a high memory, resilient material, such as sponge rubber, with an adhesive on the side contacting the pane and a heavy mastic coating on the side contacting the supporting structure. The mastic flows into and around the irregularities to form a tight moisture-proof seal with the supporting structure.

---

This invention pertains to the art of sealing and spacing strips of the type generally used between the windshield of a motor vehicle and its supporting frame and, more particularly, to a self-adherent, shock absorbing, sealing and spacing strip of this general type.

The invention is particularly applicable for use between the windshield of a motor vehicle and its supporting frame, i.e., between a smooth surface and an irregular surface, and it will be described with particular reference thereto; however, it will be appreciated that the invention has much broader applications and may be used as a sealing and spacing strip between two relatively fixed structural elements adapted for many uses and having two smooth or two irregular surfaces.

In assembly of a motor vehicle it has become common practice to provide a sealing strip at the joint between the windshield and its supporting frame. The sealing strip prevents moisture from passing through this joint and reduces the noise created by the joint. A variety of sealing strips have heretofore been used for this purpose. One of the sealing strips now widely used includes an elongated mass of tacky, mastic material. This mastic material adheres tenaciously to the various surfaces it contacts. It also flows somewhat freely into the irregular space between the windshield and the frame. For these reasons, the mastic material forms a sealing joint far superior to the joints formed by previous dry seal structures. However, this commonly used mastic material presents some problems which require certain added structural elements. For one thing, the mastic material has a consistency, or viscosity, similar to a soft rubber and a substantial amount of this material is needed to fill sufficiently the relatively large space between the windshield and frame; therefore, the mastic material tends to flow away from the joint area after the windshield is in place. In other words, the mastic material of a windshield sealing strip could not by itself form a spacer to maintain the windshield spaced outwardly from its supporting frame. Indeed, because of these characteristics of the self-adherent mastic material, it was impractical to form a sealing strip or gasket from only this material. If only the mastic material were used as a seal, the windshield would slowly move toward the frame and cause unwanted extrusion of the tacky, adherent mastic material from around the periphery of the windshield. To prevent the tendency of the mastic material to flow from the joint, the mastic sealing strips now being used include a narrow, sponge rubber band positioned on the inwardly facing side of the mastic material. This strip, known as a "dam," blocks out flow of the mastic material. The dam also maintains the mastic material in a predesigned, confined space so that the mastic material and the dam maintain a somewhat uniform spacing of the windshield with respect to the support frame.

This combined self-adherent mastic material and resilient dam sealing strip has provided a superior joint between the windshield and its frame. It is easy to install, inexpensive, and generally positive sealing. However, there are certain disadvantages with this prior combined strip. For instance, the bulk of the strip is formed from the tacky, adherent mastic material which flows under pressure. In other words, this material is not resilient, and it has an extremely low memory level, i.e., the ability to retain a given shape underpressure. For these reasons, the major portion of these prior mastic sealing strips have not exhibited any substantial shock absorbing characteristics. There was another disadvantage in providing a sealing strip formed primarily from the known, adhesive mastic materials. These materials are susceptible to temperature changes. During warm weather, the material is relatively mobile under pressure. During cold weather, the material is somewhat inflexible. This provides an inconsistency in the mounting function of the sealing strips heretofore using tacky, adherent mastic material.

The present invention is directed toward a sealing strip of the type used between the windshield of a motor vehicle and its supporting frame, which sealing strip incorporates the advantages of tacky, adherent mastic material, i.e., easy assembly, a tight joint between the various surfaces and the ability to conform to the various surface irregularities of the supporting frame, without the above-mentioned disadvantages of prior strips using this material.

In accordance with the present invention, there is provided a self-adherent, shock absorbing, sealing and spacing strip for use between the mutually facing, mounting surfaces of two spaced elements, at least one of the mounting surfaces having pronounced surface irregularities. This sealing and spacing strip comprises an elongated, shock absorbing, support tape formed from a high memory, resilient material, such as sponge plastic or rubber. The tape has first and second oppositely facing sealing surfaces, and there is provided an adhesive sealing layer on each of these sealing surfaces for contacting one of the mounting surfaces on the spaced elements. The sealing layer on the first sealing surface is formed from a known mastic sealing and adhesive compound, which compound is adapted to contact the mounting surface having the surface irregularities. The mastic layer has a thickness sufficient to fill the space between the irregular surface and the first sealing surface on the shock absorbing support tape.

In accordance with the present invention as defined above, the elongated, shock absorbing support tape forms the major portion of the total sealing and spacing strip. Since this support tape has a high memory and is not plastically deformed during use, it forms a shock absorbing structure between the structural members, which may be a windshield and its supporting frame. The mastic material is used only to provide a seal at the irregular surface of the supporting frame. In other words, the mastic material does not extend completely between the windshield and supporting frame to form the primary spacing element, as in prior mastic sealing structures. Consequently, variations in the tempreature of the sealing strip, which affect the viscosity of the mastic material, do not drastically affect the shock absorbing characteristics of the support tape or the total sealing strip.

The invention, therefore, provides a sealing strip more consistent characteristics during temperature changes.

By forming a substantial portion of the sealing strip from a resilient material instead of the mastic material, there is a substantial reduction in the total volume of mastic material used. For this reason alone, there is a reduced tendency for the mastic material to flow out from the joint between the windshield and its frame. All of these advantages of the present invention combine to provide a far superior sealing strip for use between various spaced elements, such as the windshield of a motor vehicle and its supporting frame.

The primary object of the present invention is the provision of a self-adherent, shock absorbing, sealing and spacing strip for use between two spaced elements, one having pronounced surface irregularities, which strip includes an intermediate shock absorbing support tape with a first thick, mastic adhesive layer adapted to contact the irregular surface and a second adhesive layer adapted to contact the other surface.

Another object of the present invention is the provision of a self-adherent, shock absorbing, sealing and spacing strip for use between two spaced elements, one having pronounced surface irregularities, which strip is easy to produce, easy to install, and has somewhat consistent properties during widely varying climatic conditions.

Another object of the present invention is the provision of a self-adherent, shock absorbing, sealing and spacing strip for use between two spaced elements, one having pronounced surface irregularities, which strip includes a lesser amount of adhesive, mastic material than prior mastic sealing strips of this general type.

Yet another object of the present invention is the provision of a self-adherent, shock absorbing, sealing and spacing strip for use between two elements, one having pronounced surface irregularities, which strip is easily rolled onto a supporting spool for shipment and storage.

These and other objects and advantages will become apparent from the following description used to illustrate the preferred embodiments of the invention as read in connection with the accompanying drawings in which:

FIGURE 1 is a pictorial, cross sectional view illustrating one embodiment of the present invention;

FIGURE 2 is a pictorial, cross sectional view showing the use of the embodiment illustrated in FIGURE 1;

FIGURES 2A and 2B are cross sectional views taken generally along lines 2A—2A and 2B—2B, respectively, of FIGURE 2 and illustrating certain operating characteristics of the present invention;

FIGURE 3 is a fragmentary front plan view illustrating a modification of the present invention;

FIGURES 3A, 3B, 3C and 3D are cross sectional views taken generally along line 3A—3A of FIGURE 3 and showing various modifications of a portion of the invention illustrated in FIGURE 3;

FIGURE 4 is a cross sectional view illustrating a further modification of the present invention;

FIGURES 4A and 4B are enlarged, fragmentary views illustrating certain modifications of the embodiments shown in FIGURE 4;

Figure 5:
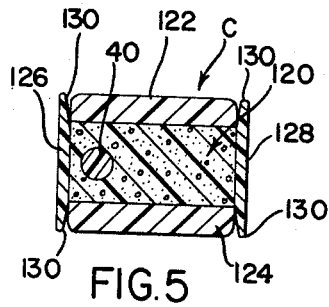
FIGURES 5-12 are cross sectional views illustrating still further modifications of the present invention; and, FIGURE 13 is a cross sectional view illustrating the embodiment of the invention shown in FIGURE 5 as it is coiled upon a support spool.

Referring now to the drawings wherein the showings are for the purpose of illustrating preferred embodiments of the invention only and not for the purpose of limiting same, FIGURE 1 shows a self-adherent, shock absorbing, sealing and spacing strip A including, as a primary element, an elongated support tape or strip 10. This tape is formed from appropriate resilient material, such as a closed cell sponge plastic or rubber. The term "closed and there is no path for moisture to pass, by capillary action or otherwise, through the tape 10. This support tape has a high memory so that it can be used as both a shock absorbing and spacing element for the sealing strip A. Of course, various other materials may be used for forming the tape 10 without departing from the present invention. For instance, the tape may be open cell sponge material, as well as other nonsponge, resilient materials.

As illustrated, the elongated tape includes oppositely facing sealing surfaces 12, 14 and side surfaces 16, 18. On surface 12 there is provided a relatively thick layer 20 of self-adherent, adhesive, mastic material. The use of such mastic material in sealing strips of this general type is well known. It is an extremely adhesive material which tenaciously adheres to most surfaces. As is known, this material generally has a high viscosity and flows under pressure unless it is confined physically. The exact composition of this material does not form a part of the present invention. An example of such a mastic material is disclosed in United States Letters Patent No. 3,076,777.

The thickness of the mastic layer 20, represented in FIGURE 1 as $y$, is such to compensate for various surface irregularities found on the surfaces to which the layer adheres. The thickness $y$ is generally in the range of $1/16$–$3/16$ inch and, preferably, in the range of $1/16$–$1/8$ inch. It has been found that this thickness of the mastic layer 20 is sufficient to allow use of strip A with surfaces having substantial surface irregularities.

On surface 14 there is provided a relatively thin adhesive layer 22. This layer has a thickness $x$. In practice this layer is formed from the same self-adherent, mastic material used to form the thick mastic layer 20, although it is possible to use a dissimilar adhesive material. As will be explained later, adhesive layer 22 is adapted to contact a relatively smooth surface; therefore, the layer 22 has a thickness $x$ which is at least three mils and, preferably, 15–60 mils. By providing a relatively thin layer 22, there is little flow out of the mastic material when the sealing strip A is forced against a smooth surface, which in this case is the inner surface of a windshield 30 shown in FIGURE 2.

Referring now more particularly to FIGURE 2, the windshield 30 is supported on a stationary frame 32 having a wall 34 which forms a mounting surface for the sealing strip A. Wall 34 is generally parallel to the inner surface of windshield 30. In practice, the inner surface of wall 34 has a variety of unavoidable surface irregularities. To illustrate these irregularities, which may differ substantially in form, a protrusion 35 and an indentation 35a are shown. Of course, other irregularities, such as metal seams and other identations, are generally encountered. The frame 32 also includes a lower peripheral wall 36 which combines with the wall 34 to define the support structure for windshield 30. The strip A is first mounted against wall 34 by bringing the thick mastic layer 20 into contact with the wall 34. The mastic layer 20 is sufficiently thick to encapsulate or surround irregularity 35 and fill indentation 35a by the normal flowing of the mastic material around or into the irregularities. In this way, the layer 20 completely fills the irregular space defined between the sealing surface 12 of tape 10 and the irregular surface 34 of frame 32. If the mastic layer 20 were not sufficiently thick to completely fill the space between surfaces 12 and 34, the various surface irregularities would protrude through the mastic layer and directly contact surface 12 or voids would be formed at identation 35a. This would provide a reduced seal at the surface irregularities. A sufficient number of these direct contacts and/or voids could form moisture paths through the strip A. For this reason, the layer 20 has a sufficient thickness to completely fill the space so that the irregularities do not, as a normal occurrence, contact the sealing surface 12.

After the strip A is in place against the wall or surface 34, the windshield 30 is forced against the sealing surface 22. Since the inner surface of the windshield is relatively smooth, thin layer 22 forms a tight mastic bond with the windshield. Due to the relatively minor amount of mastic in layer 22, the surface tension of the inner surface on windshield 30 and the surface 14 substantially prevents out flow of the mastic. If a relatively thick layer of mastic were used at this position, the out flow would be pronounced along the windshield.

The operation of the shock absorbing, sealing and spacing strip A is illustrated by FIGURES 2, 2A and 2B. Tape 10 maintains its dimensions without plastic flow; consequently, tape 10 maintains a preselected minimum spacing between the windshield and wall 34. In addition, as shown in FIGURE 2A, the resiliency of tape 10 allows the windshield to vibrate in a direction parallel of the surface 34 without causing actual movement of either mastic layer 20 or 22. Consequently, there is very little frictional heat generated within the mastic to cause a decrease in the viscosity of the mastic. This is substantial improvement over a sealing strip wherein the mastic extends between the windshield and the frame wall 34. In those instances, vibration of the windshield is actually absorbed by the mastic itself which causes an increase in the internal temperature of the mastic and a corresponding decrease in its viscosity. FIGURE 2B illustrates that vibrations of the windshield 30 in a direction normal to wall 34 are also absorbed, to a great extent, by the resiliency of tape 10. Again, this has the same attributes as explained in connection with FIGURE 2A.

It is readily appreciated that the present invention has substantial advantages over known sealing strips which use self-adherent mastic to form a tight seal with surfaces which may have irregularities. The main structural feature of strip A which results in these improvements is the use of a resilient support tape between a thick layer of mastic and a relatively thin layer of mastic. As will be explained later, if both mounting surfaces against which a strip is mounted have surface irregularities, two relatively thick mastic layers may be provided. Even though there is one smooth surface against which the strip is mounted, it is still possible to use two relatively thick mastic layers if flow controlled dams are supported with respect to the tape 10. This aspect of the present invention is included in various other embodiments, which will be described hereinafter in some detail.

In most installations, the sealing strip A must be supported onto wall 34 in a curved path, generally a path which is bent around the inner side surface 16. Since tape 10 is resilient and may be stretched during assembly, it has been found that the strip A may pull away from its initial assembled position, usually in the area of a bend, such as shown in FIGURE 3. To overcome this difficulty, and in accordance with another aspect of the present invention, the sealing strip A is provided with a modified inner tape 10a, best shown in FIGURE 3A. This tape includes a reinforcing means in the form of a strand 40 located adjacent the inner side surface 16. Strand 40 has a modulus of elasticity which is greater than the modulus of elasticity of the material forming tape 10a. In other words, when a force is applied to the inner tape, which would stretch the same, the reinforcing means 40 prevents the tape from stretching. The reinforcing strand 40 may be a plastic or fiber strand, a metal wire, or another similar elongated element. In accordance with the invention, strand 40 is bonded within tape 10a and adjacent the inner side surface of the tape so that the tape will not pull away after being assembled around a bend.

Referring now to FIGURE 3B, there is illustrated a modification of the reinforcing means or strand 40. In accordance with this modification, there are provided a plurality of separate reinforcing strands 50, 52, 54 within resilient tape 10b. These strands are bonded within the tape in a manner similar to the strand 40 shown in FIGURE 3A. In FIGURE 3C, the resilient tape 10c is provided with a fabric layer 60 adhered onto the inner side surface 16. In a like manner, as shown in FIGURE 3D, tape 10d may be provided with a molded relatively unstretchable rubber layer 70 on side surface 16. The layers 60 and 70 serve the same function as the reinforcing strands 40, 50, 52 and 54 shown in FIGURES 3A and 3B. It is readily apparent how the function of the reinforcing means in the various modified support tapes prevents stretching of the support strip when it is initially assembled.

In many instances, it is desirable to form the elongated support tape from an open cell foam or sponge material. This material often has resilient characteristics more adapted for supporting a windshield. When such material is used, the material must be sealed to prevent passage of moisture. Such a sealing structure is illustrated in FIGURE 4 wherein sealing strip B includes a support strip 80 formed from open cell foam or sponge material. The strip B includes sealing surfaces 81, 82 and side surfaces 84, 86. A thick layer of self-adherent, mastic material 90 is secured onto surface 81, and a relatively thin mastic layer 92 is secured onto sealing surface 82. Surface 84 is provided with an impervious, thin resilient strip 94. This strip has an outwardly extending, generally triangular cross sectioned lip 96. This lip tapers outwardly from the mastic layer 90 and forms a dam for controlling flow of the mastic in layer 90 when the strip B is being assembled. To close the surface 86, there is provided a second impervious strip 100 having an outwardly tapering lip 102. The strips 94, 100 prevent passage of moisture through strip 80. During assembly, the lips or dams 96, 102 prevent out flow of the mastic material 90. These lips contact the inner surface of wall or surface 34 as shown in FIGURE 2.

Referring now to FIGURE 4A, the lip or dam 104 on strip 94 tapers inwardly toward the mastic layer 90. This dam is spaced from the upper surface of the mastic layer a distance $z$. By this construction, the dam 104 contacts the inner surface 34 before the mastic layer 90. This causes the dam to fold inwardly to control the outward flow of the mastic during the assembly of strip B. Of course, the lips or dams 96, 102, as shown in FIGURE 4, could also be extended outwardly beyond the layer 90 for the same purpose. Referring now to FIGURE 4B, the lip or dam 110 is formed as an outward extension of the impervious sealing strip 94. In this manner, the dam 110 folds outwardly away from the sealing strip to provide a larger volume for the flow of the mastic layer 90. It is appreciated that various modifications may be made in these impervious strips 94, 100. It is also appreciated that the lip 102 may have a lesser height than the lip 96 so that the mastic material 90 may flow over the strip 100 and toward the lower wall 36 of support frame 32. As will be explained later, the impervious strips or the dams formed thereby may be made as integral parts of the resilient tape for the sealing and spacing strip B. Of course, various other modifications may be made in this particular aspect of the invention without departing from the intended spirit and scope of the present invention.

Referring now to FIGURE 5, a sealing and spacing strip C is provided with an inner resilient tape 120 and two relatively thick layers of self-adherent, mastic material 122, 124. This particular embodiment of the invention is well adapted for use between two mounting surfaces, one or both of which have surface irregularities that must be compensated for by the flow of the mastic material. In this embodiment, impervious strips 126, 128 are provided on each side of the strip 120 to prevent the flow of moisture through the support strip. Each of the impervious strips includes a dam 130 at each edge. These dams control the flow of the mastic material within both layers 122, 124. Again the strips 126, 128 could be formed integrally with tape 120, without departing from the intended scope of the present invention.

Figure 6:
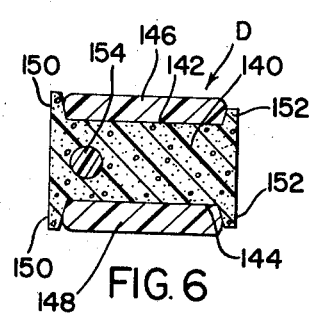

Referring now to FIGURE 6, a further modification of the sealing strip is illustrated. The sealing strip D includes resilient tape 140 having oppositely facing sealing surfaces 142, 144. Relatively thick mastic layers 146, 148 are provided on the sealing surfaces for purposes previously explained. Integrally formed with respect to tape 140 are oppositely extending dams 150, 152. The dams 150 are provided on the inner surface of tape 140, and they have outwardly extending lengths greater than the dams 152. In this manner, the mastic material tends to flow only over the dams 152. An appropriate reinforcing element 154 is provided adjacent the inner surface of the tape 140.

Figure 7:
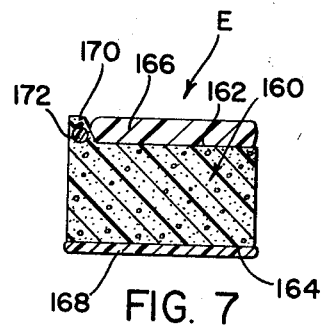

A further modification of the present invention is illustrated in FIGURE 7 wherein a sealing strip E is provided with a resilient tape 160 having oppositely facing sealing surfaces 162, 164. A thick mastic layer is provided on surface 162, and a relatively thin mastic layer 168 is provided on the surface 164. Since the relatively thin layer requires no flow control, the integrally formed dam 170 is provided only adjacent layer 166. In this embodiment of the invention, the reinforcing element 172 is formed within the dam 170. This assists the dam in performing the function of controlling the outward flow of the mastic in layer 166.

Figure 8:
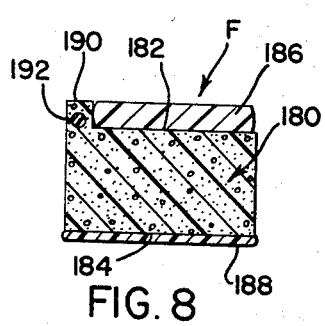

A further modification of the present invention is illustrated in FIGURE 8. In this figure, strip F includes a resilient tape 180 having oppositely facing sealing surfaces 182, 184. A thick mastic layer 186 is provided on surface 182, and a relatively thin mastic layer 188 is provided on the sealing surface 184. Again, only one dam 190 is required. This dam is on the inner surface of tape 180 directly in front of the mastic layer 186. Dam 190 differs from dam 170, of strip E, by being rectangular in cross-section. This provides a more rigid seal with the irregular surface onto which the strip F is adhered. A reinforcing element 192 is provided within the dam.

Figure 9:
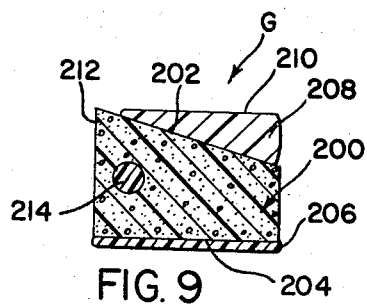

Yet another modification of the present invention is illustrated in FIGURE 9. A sealing strip G is provided with a resilient tape 200 having oppositely facing sealing surfaces 202, 204. In this embodiment, the surface 202 tapers downwardly away from the inner surface of the tape 200. A thin mastic layer 206 is provided on surface 204. A relatively thick mastic layer 208 is deposited onto the tapered surface 202. Surface 204 may also be tapered in a similar fashion. In order to provide the necessary sealing function, mastic layer 208 has an upper surface 210 which is generally parallel to the lower sealing surface 204 of the tape 200. By providing the tapered body of mastic material, there is a lesser amount of mastic material adjacent dam 212. In this manner, there is a lesser tendency of the mastic material to flow outwardly beyond the flow control dam 212. As previously mentioned, flow of the mastic material way from the dam is not considered detrimental because such a flow is within a relatively confined space and does not distract from its appearance. In this embodiment, the reinforcing element 214 is positioned below the dam 212, for purposes previously explained.

Figure 10:
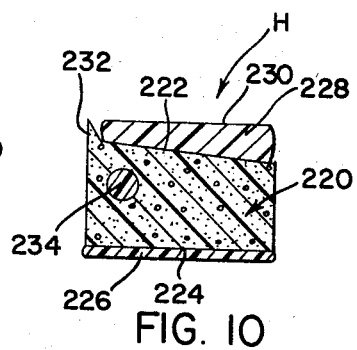

In FIGURE 10 a sealing strip H is illustrated. This strip is somewhat similar to the strip G shown in FIGURE 9. Strip H includes a resilient tape 220 having oppositely facing, nonparallel, sealing surfaces 222, 224. A thin mastic layer 226 is deposited onto surface 224. A relatively thick, but tapered, mastic layer 228 is deposited onto the tapered surfaces 222. In this embodiment of the invention, there is a more distinct dam 232 for controlling the flow of the mastic material within layer 228. By using an abrupt dam, the amount of mastic material adjacent the dam can be increased without causing out flow of the mastic material around the dam.

Figure 11:
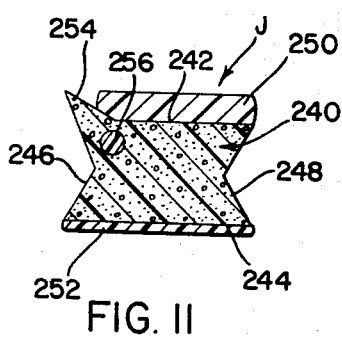

Referring now to FIGURE 11, a sealing strip J is provided with a resilient tape 240 including oppositely facing, generally parallel, sealing surfaces 242, 244. In this embodiment of the invention, the side surfaces 246, 248 of tape 240 have a controlled contour. This forms another aspect of the present invention. It has been found that, in some instances, if the resilient tape material is selected according to its resistance to various climate conditions, its durability in use, its costs and similar factors, the tape does not have the optimum resiliency or shock absorbing characteristics. Consequently, it was first believed essential to compromise on these various physical characteristics. This produced a sealing strip which did not have all optimum physical properties. By contouring the side surfaces 246, 248 it has been found that the resiliency and shock absorbing characteristics of the resilient tape may be modified while retaining other wanted characteristics of the tape, such as resistance to atmospheric conditions. The contour illustrated in FIGURE 11 is, of course, only representative. The necessary resiliency may require that the side surfaces of the tape be either concave or convex, or a combination thereof. The strip J includes an upper relatively thick mastic layer 250 and a lower relatively thin mastic layer 252. A flow control dam 254 is provided adjacent a surface 246, for purposes previously explained.

Figure 12:
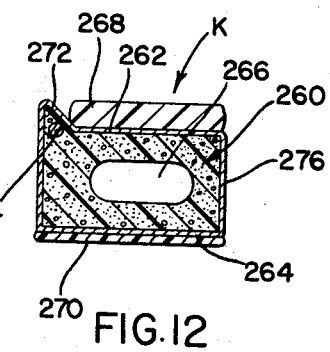

A still further modification of the present invention is illustrated in FIGURE 12. A sealing strip K includes a resilient tape 260 having oppositely facing sealing surfaces 262, 264. An elongated contoured inner cavity 266 is provided to control the resiliency of the tape 260. The cavity functions in a manner similar to the contour of the side surfaces as shown in FIGURE 11. The cavity may have a variety of contours, according to the desired resiliency to be imparted to the resilient tape. The use of this inner cavity has the advantage that the outer surfaces of the supporting strip need not be modified in a manner which will change their overall appearance. A relatively thick mastic layer 268 is deposited onto surface 262, and a relatively thin mastic layer 270 is deposited onto surface 264. A dam 272 having a reinforcing element 274 is provided at the inner end of a tape 260. In this embodiment of the invention, a membrane 276 encapsulates resilient tape 260. By this structure, the color of the tape may be changed, and more importantly, an open celled foam or sponge material may be used without allowing passage of moisture.

Numerous embodiments of the present invention have been explained; however, it is appreciated that various other modifications may be made in the illustrated sealing and spacing strip without departing from the intended spirit and scope of the invention. In addition, the sealing and spacing strip may include one or more of the various structural features illustrated by the separate embodiments.

Figure 13:
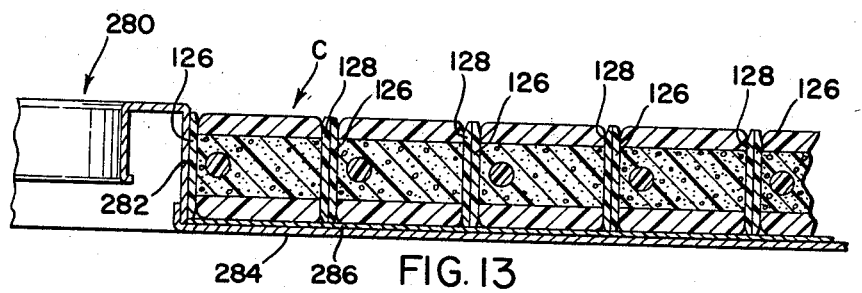

Since the mastic material tenaciously adheres to various surfaces, it is always a difficult task to ship and store the strip prior to assembly. By using the spaced impervious strips 126, 128, as shown in FIGURE 5, the strip C may be shipped quite conveniently. This aspect of the invention is shown in FIGURE 13. A spool 280 includes a vertical hub 282 and a lower support plate 284. By winding the strip C about the inner strip 126, the strip C may be easily deposited onto the support plate 284 as clearly shown in FIGURE 13. To prevent adherence of the lower mastic layer 124 onto the plate 284, the plate 284 is provided with an upper release paper layer 286. This aspect of the invention illustrates certain ancillary benefits obtained by constructing the sealing strip in accordance with the present invention.

Although the present invention has been described in connection with certain structural embodiments, it should be appreciated that various changes in these embodiments may be made without departing from the intended spirit and scope of the present invention, as defined in the appended claims.

Having thus described our invention, we claim:

1. A self-adherent, shock absorbing, sealing and spacing strip for use between the facing mounting surfaces of two spaced elements, at least one of said mounting surfaces having irregularities, said sealing and spacing strip comprising: an elongated, shock absorbing support tape formed from a high memory, resilient material, said support tape having first and second oppositely facing sealing surfaces; and, an adhesive sealing layer on each of said sealing surfaces for contacting one of said mounting surfaces, said layer on said first sealing surface being formed from a mastic sealing and adhesive compound, said mastic layer being adapted to contact said irregular mounting surface and having a thickness sufficient to fill the space between said irregular surface and said first surface, and said support tape being formed from a sponge, resilient material having opened cells and means for sealing said support strip in a direction transverse of said support tape and parallel with said mounting surfaces, said support tape having two transversely spaced side surfaces extending between said sealing surfaces and said sealing means including a resilient, impervious strip coextensive with one of said side surfaces, and one of said impervious strips extending outwardly beyond said first sealing surface to form a flow controlling dam for said mastic layer.

2. A self-adherent, shock absorbing, sealing and spacing strip for use between the facing mounting surfaces of two spaced elements, at least one of said mounting surfaces having irregularities, said sealing and spacing strip comprising: an elongated, shock absorbing support tape formed from a high memory, resilient material, said support tape having first and second oppositely facing sealing surfaces; and, an adhesive sealing layer on each of said sealing surfaces for contacting one of said mounting surfaces, said layer on said first sealing surface being formed from a mastic sealing and adhesive compound, said mastic layer being adapted to contact said irregular mounting surface and having a thickness sufficient to fill the space between said irregular surface and said first surface, and said support tape being formed from a sponge, resilient material having opened cells and means for sealing said support strip in a direction transverse of said support tape and parallel with said mounting surfaces, said support tape having two transversely spaced side surfaces extending between said sealing surfaces and said sealing means including a resilient, impervious strip coextensive with one of said side surfaces, and both of said impervious strips extending outwardly beyond said first sealing surface to form flow controlling dams for said mastic layer.

3. A self-adherent, shock absorbing, sealing strip as defined in claim 2 wherein at least one of said dams extends beyond said mastic layer.

4. A self-adherent, shock absorbing, sealing and spacing strip for use between the facing mounting surfaces of two spaced elements, at least one of said mounting surfaces having irregularities, said sealing and spacing strip comprising: an elongated, shock absorbing support tape formed from a high memory, resilient material, said support tape having first and second oppositely facing sealing surfaces; and, an adhesive sealing layer on each of said sealing surfaces for contacting one of said mounting surfaces, said layer on said first sealing surface being formed from a mastic sealing and adhesive compound, said mastic layer being adapted to contact said irregular mounting surface and having a thickness sufficient to fill the space between said irregular surface and said first surface, said support tape having two transversely spaced side surfaces extending between said sealing surfaces, and a flow controlling dam along one of said side surfaces and extending outwardly beyond said first sealing surface.

5. A self-adherent, shock absorbing, sealing strip as defined in claim 4 wherein said dam has a generally triangular cross-section.

6. A self-adherent, shock absorbing, sealing strip as defined in claim 5 wherein said dam tapers outwardly and away from said mastic layer.

7. A self-adherent, shock absorbing, sealing strip as defined in claim 4 wherein said dam is generally rectangular in cross-section.

8. A self-adherent, shock absorbing, sealing strip as defined in claim 4 wherein said dam is integral with said support tape.

9. A self-adherent, shock absorbing, sealing strip as defined in claim 4 wherein said dam is formed from a resilient strip bonded onto said one side surface of said support tape.

References Cited

UNITED STATES PATENTS

| | | | |
|---|---|---|---|
| 2,370,647 | 3/1945 | Fischer | 94—18.2 |
| 2,781,561 | 2/1957 | Gifford et al. | 52—398 X |
| 3,155,422 | 11/1964 | Campbell et al. | 52—397 X |
| 3,241,277 | 3/1966 | Coppock | 52—208 |
| 3,261,087 | 7/1966 | Schlumberger | 94—18 X |
| 3,274,740 | 9/1966 | Hall | 52—208 |

FOREIGN PATENTS

| | | |
|---|---|---|
| 678,685 | 1/1964 | Canada. |

ALFRED C. PERHAM, *Primary Examiner.*

U.S. Cl. X.R.

52—397; 49—475; 161—167